May 4, 1954    C. H. NEFF    2,677,388
RUBBER INFLATION VALVE WITH INTERLOCKING DETACHABLE CLOSURE
Filed Aug. 30, 1951
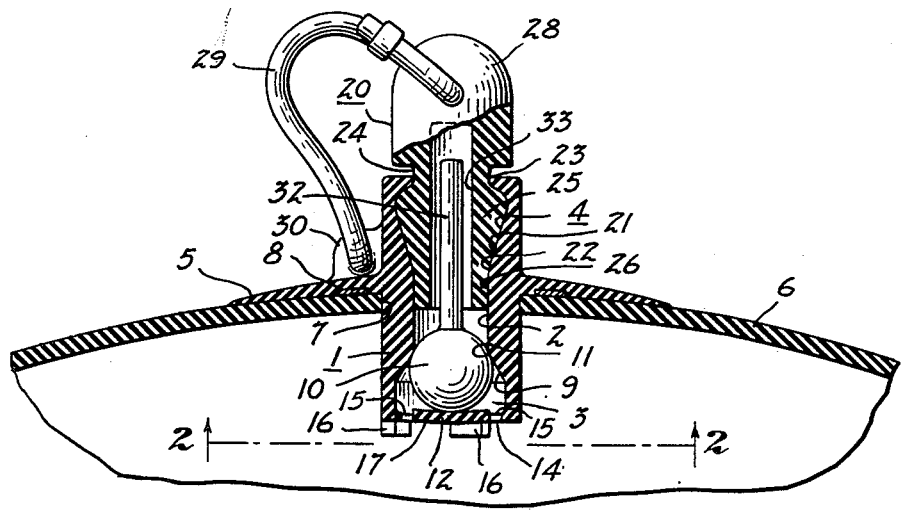
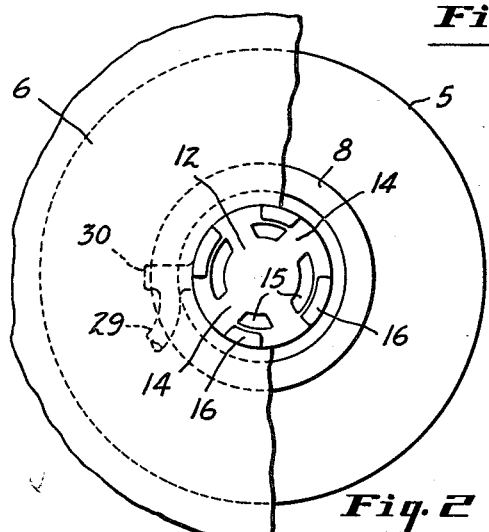
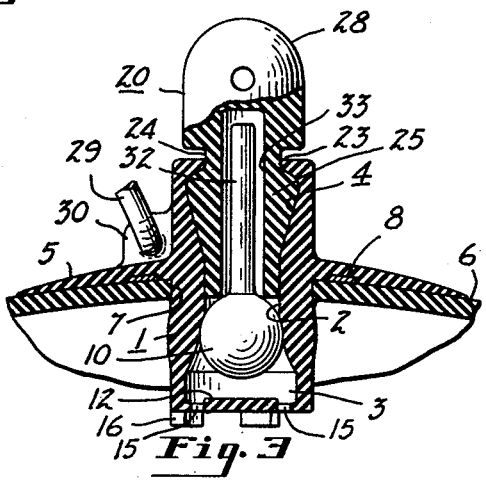
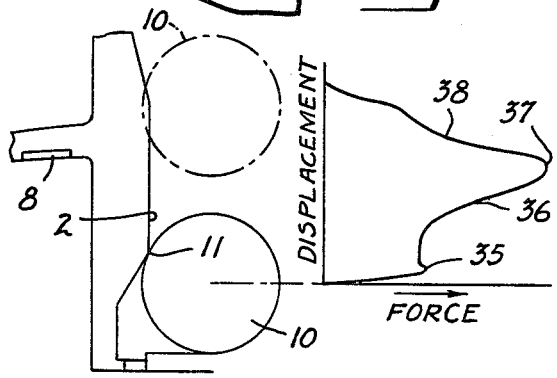
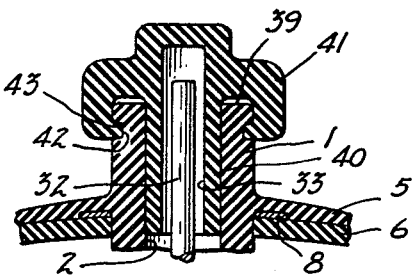
INVENTOR
Clarence H. Neff
BY Evans & McCoy
ATTORNEYS Patented May 4, 1954

2,677,388

UNITED STATES PATENT OFFICE 2,677,388

RUBBER INFLATION VALVE WITH INTER-
LOCKING DETACHABLE CLOSURE

Clarence H. Neff, Alexandria, Va., assignor to The
General Tire and Rubber Company, Akron,
Ohio, a corporation of Ohio Application August 30, 1951, Serial No. 244,382

2 Claims. (Cl. 137—232)

This invention relates to valves, more particularly to deformable valves of rubber or the like in which a movable body or closure plug is received against a yieldable seat that is formed integrally with the valve casing.

One of the principal objects of the invention is to provide a valve of the character mentioned which accommodates excess movement of the valve closure body against or relative to the valve seat under conditions of severe pressure.

Another object of the invention is to provide a valve having a rubber casing of generally tubular form and a relatively nonyielding body or plug that is insertable through an end opening in the casing and is movable longitudinally through the casing to normal operating position by distending the walls of the casing.

Another object is to provide a valve of the character mentioned in which an inextensible band is carried by the tubular casing and controls or restricts the distention of the casing to increase the force required to expel a sealing valve body axially through the casing subsequent to displacement of the valve body from the integral valve seat. As a preferential arrangement the inextensible annulus is carried by an integral circular flange formed on the rubber valve casing, such flange also serving as a means of attachment for securing the valve to an article to be filled through the valve.

Another object is to provide a valve of the rubber casing type which embodies multiple sealing means. According to this aspect of the invention, the rubber casing is formed with an integral annular seat against which is yieldingly received a movable valve body in the provision of a primary seal. The rubber casing is also formed to receive a plug which is embraced and frictionally gripped by the casing to provide a secondary seal.

Other refinements of the invention include means integral with the rubber casing of the valve for engaging the movable valve body and holding the latter in sealing engagement against the rubber valve seat, means integral with the rubber casing for spacing the end of the casing from the walls of any collapsible container to which the valve is attached and for providing passages for the flow of fluid into and out of such container through the valve casing. The invention also contemplates an improved sealing plug and tubular rubber valve casing combination in which the sealing plug and casing are complementally formed to provide both frictional and mechanical interlocks to hold the parts in assembly, and an improved movable valve closure body—tubular rubber casing assembly in which a stemmed valve body is movable by casing wall distention longitudinally through the rubber casing to operative position against an integral valve seat, the stem normally being disposed axially in the casing passage.

The above and other objects and advantages relating to certain novel combinations and arrangements of parts are apparent in the following description made in connection with the accompanying drawings which form part of the specification.

In the drawings:

Figure 1 is a sectional view taken longitudinally through the valve of the present invention and through a fragmentary portion of the wall of a rubber container to which the valve is attached;

Fig. 2 is a bottom view of the valve with parts broken away and removed, taken substantially along the line 2—2 of Fig. 1;

Fig. 3 is a section detail similar to Fig. 1 showing the spherical valve body displaced outwardly into the cylindrical valve passage from the normal position of the valve body against the tapered or conical valve seat;

Fig. 4 is a schematic diagram representing the relative change in the force required to move the spherical valve body longitudinally through the valve passage as the valve body is drawn out or expelled; and Fig. 5 is a fragmentary sectional detail of a modified form of cap and plug.

The valve assembly of the present invention comprises a tubular rubber casing 1 which is of circular section and is formed as by molding rubber in a heated metal mold, the rubber being compounded to have the physical characteristics of conventional tread stock used in making pneumatic passenger vehicle tires. Extending longitudinally through the casing is an axial passage which includes a central or intermediate cylindrical portion 2 and enlarged end portions 3 and 4.

On the outside of the casing and preferably integral therewith is a circular attaching flange 5 which is disposed in a plane normal to the axis of the casing and the casing passage, the plane of the attaching flange being intermediate the ends of the cylindrical central portion 2 of the passage. The circular flange 5 is bonded to rubber wall 6 of the container or other article with which the valve is to be used. A portion of the valve casing 1 projects into the interior of the container through an aperture or opening 7. While the opening 7 may be of any convenient size to receive the valve casing and afford sufficient overlap of the attaching flange 5 for securing the latter to the container wall 6, it is preferable that the valve casing 1 be closely embraced by the walls of the opening 7. The container wall 6 thus covers or extends over control ring 8 formed of metal or other rigid inextensible material which is permanently bonded to and embedded in the underside of the attaching flange 5 during molding of the valve.

The passage portion 3 within the inner end of the valve casing is formed with a tapered or conical wall portion 9 which constitutes a seat for a spherical valve body or plug 10 formed of a relatively hard nonyielding material such as metal or solid plastic composition. The conical valve seat intersects the cylindrical walls of the middle passage portion 2 in a circular ridge 11 that makes line contact with the movable valve body 10. To retain the valve body in sealing engagement with the conical seat 9 or the circular ridge 11, a resilient rubber spider 12 is disposed across the end of the passage portion 3, this spider being formed integrally with the casing 1 during the molding of the latter. The spider includes leg portions 14 and intervening spaces 15. The proportions of the valve body and of the spacing of the spider from the valve seat are chosen so that there is preferably at least some tension in the spider when the body is in contact with the valve seat. A plurality of spacing lugs 16 are also formed on the end of the valve casing 1. These lugs project axially beyond the end of the casing and are engageable with the opposite wall of the container to which the valve is attached to prevent such opposite wall from sealing the end of the valve passage. Spaces 17 between adjacent lugs 16 permit the flow of fluid into or out of the valve passage through the spider openings 15.

The large passage portion 4 in the outer end of the valve casing, at the opposite end of the cylindrical passage portion 2 from the passage portion 3 receives a plug 20 formed of plastic or rubber composition or similar material having sufficient stiffness to permit manipulation to insert it into the valve passage. The outer enlarged passage portion 4 has a conical or tapered wall portion 21 which intersects the cylindrical passage portion 2 in a circular line indicated at 22. At the extreme outer end of the casing 1 the walls of the passage portion 4 converge toward one another in the provision of a circular inwardly directed flange or lip 23 which is distended in assembly to receive and closely embrace neck 24 of the plug 20. The portion of the plug which is received within the valve casing is formed with a surface of revolution complemental to that of the valve passage portions in which it is received. The plug thus includes a relatively large diameter tapered portion 25 received in that part of the passage portion 4 defined by the tapered walls 21 and a relatively small diameter cylindrical portion 26 which extends into and is embraced by the cylindrical walls of the middle passage portion 2. The plug 20 is slightly larger than the valve passage so as to distend the casing 1, the walls of the latter thus frictionally embracing both the tapered portion 25 and the cylindrical portion 26 of the plug. An integral handle portion 28 on the outer end of the plug is connected as by a lanyard 29 to an ear 30 integral with the valve casing 1 to hold the plug captive when removed from the casing passage.

To assemble the valve the cylindrical valve body 10 is introduced into the passage through the opening defined by the circular lip 23. The valve body is then forced axially through the casing passage and into the passage portion 3 at the inner end of the casing. In moving through the cylindrical passage portion 2 the valve body 10, being of larger diameter than the passage, distends the casing walls. When received within the passage portion 3 the valve body is held yieldingly against the tapered seat 9 or the ridge 11 by the inherent resiliency of the spider 12.

To open the valve passage for the flow of fluid either into or out of the container to which the valve is attached, the valve body 10 is displaced downwardly or against the spider 12, stretching the latter. In certain instances, as when it is desired to increase the rate of flow, the valve body 10 is completely removed from the valve casing by withdrawing it axially through the central passage. To facilitate such withdrawal a stem 32 is formed integrally with or secured to the spherically shaped valve body 10, the stem normally extending axially through the valve passage and being received in a recess or bore 33 formed in the plug 20. The recess 33 is sufficiently large to provide ample clearance about the valve stem so that distortion of the rubber valve casing in normal use does not displace the valve body 10 from sealing engagement with the valve seat.

Under conditions of high internal fluid pressure within the container to which the valve is attached, as sometimes occurs when the valve is used on a droppable serial container, the valve body 10 may be forced beyond the conical seat 9 and into the cylindrical portion 2 of the passage. This movement of the valve body into the smaller diameter portion of the axial valve passage distends the walls of the casing as indicated in Fig. 3. As the valve body approaches the plane of the restraining ring 8 in moving axially through the cylindrical portion of the passage, resistance to distention of the casing walls increases and relatively greater force is required to move the valve body. After the valve body passes the plane of the ring 8 in moving axially through the passage the force to move the valve body progressively diminishes.

The relative force required to move or displace the valve body through the valve passage is illustrated diagrammatically in the graph, Fig. 4. The relative force applied to the spherical valve body and acting axially of the passage is shown in relation to the displacement of the center of such valve body as the latter is drawn through the valve passage. The valve body strongly resists sliding movement relative to the sealing ridge 11, this ridge normally moving axially with the valve body during the intial movement of the latter. When the force applied to the valve body overcomes the frictional grip of the valve seat on the valve body and sliding commences, as at point 35 on the graph, the required force diminishes slightly and then remains substantially constant until the valve body moves into that portion of the cylindrical passage 2 the distention of which is influenced or restrained by the inextensible annulus 8. Due to the restraint of the ring 8 on the distention of the casing the force then required to move the valve body through the passage strongly increases, as indicated by portion 36 of the curve. Upon passing the plane of the ring 8, represented by point 37 on the curve, the force required to move the valve body rapidly and progressively decreases, as indicated by portion 38 of the curve.

Thus the relationship of the valve body to the resilient walls of the valve passage is such that, between the seat in the conical passage portion and the plane of the ring 8, an increasing amount of energy is required to effect the displacement. This frictional restraint on movement of the valve body through the passage can be effectively used in dissipating energy such as may be exerted on the valve body by internal container pressures developed as upon landing of a droppable container equipped with the valve.

In Fig. 5 is illustrated a modification in which the restraining ring 8 closely surrounds the cylindrical rubber casing 1 instead of being spaced radially outward from the cylindrical surface generated by the outer walls of the casing as in the embodiment shown in Fig. 1. The modified arrangement relatively increases resistance to withdrawal of the spherical valve body axially through the cylindrical passage, thereby increasing the internal pressure that can be developed in a container to which the valve may be attached before the valve body will be expelled from the casing.

The cylindrical passage portion 2 in the Fig. 5 modification is of uniform diameter from the conical or tapered valve seat 9 to top or outer end face 39 of the cylindrical casing. In lieu of the tapered plug shown in Figs. 1 through 3 the modification of Fig. 5 has a one-piece combination cap and plug. This plug includes a cylindrical portion 40 received within and frictionally gripped by the walls of the passage portion 2 and a hollow cap portion 41 that is received over and embraces the upper or outer end of the cylindrical casing 1. An inturned annular lip 42 on the cap portion 41 is received in an annular groove or channel 43 formed in the outer face of the casing 1. The interlock of the lip 42 in the groove 43 locates the cap in assembly, provides a mechanical connection between the parts which resists separation from the valve casing and serves as a supplemental seal.

Internal pressure within the casing passage 2 has an expanding effect on the casing which increases the strength of the cap interlock. This feature is advantageous in valves intended for use under conditions of severe shock loads such as are encountered with droppable or aerial delivery containers. A sudden increase of internal pressure of short duration such as occurs when a droppable container strikes the ground can be more effectively resisted by this type of combination plug and cap. The interlocking grip is strengthened by the internal pressure tending to distend the valve casing wall.

In accordance with the patent statutes the principles of the present invention may be utilized in various ways, numerous modifications and alterations being contemplated, substitution of parts and changes in construction being resorted to as desired, it being understood that the articles shown in the drawings and described above are given merely for purposes of explanation and illustration without intending to limit the scope of the claims to the specific details disclosed.

What I claim and desire to secure by Letters Patent of the United States is:

1. A valve comprising in combination a one piece rubber element which includes a tubular rubber body formed with an axial passage, said passage comprising a central circular sectioned portion of relatively small cross sectional area and end portions of relatively large cross sectional area, the rubber body providing passage walls formed to define an annular seat intermediate the central passage portion and one of the end passage portions, the central portion of the passage being of greater axial length than diameter, a closure member disposed in the one end passage portion, a stem on the closure member extending axially through the central and other end passage portions, means integral with the rubber body engaging the closure member and yieldingly holding the latter sealingly against the valve seat, a substantially inextensible annulus bonded to the rubber element in embracing relation to the small area passage portion to restrain distention of the pasagse walls, the annulus being disposed in a plane spaced axially from the annular seat to localize the distention restraint in a zone spaced axially from the annular seat, a plug receivable in the other end passage portion, said plug having a relatively large sectioned part disposed within said other end passage portion and a relatively small sectioned part disposed within the central passage portion, said closure member being capable of being withdrawn through said passage only upon application of relatively strong forces which reach a maximum at the small area passage portion the central passage walls being distended by the small part of the plug and resiliently embracing the latter and interfitting formations on the plug and the tubular element providing a mechanical interlock to retain the plug in the passage.

2. A valve comprising in combination a one piece rubber element which includes a tubular rubber body formed with an axial passage, said passage comprising a central circular sectioned portion of relatively small cross sectional area and end portions of relatively large cross sectional area, the rubber body providing passage walls formed to define an annular seat intermediate the central passage portion and one of the end passage portions, the central portion of the passage being of greater axial length than diameter, a closure member disposed in the one end passage portion, means integral with the rubber body engaging the closure member and yieldingly holding the latter sealingly against the valve seat, a substantially inextensible annulus bonded to the rubber element in embracing relation to the small area passage portion to restrain distention of the passage walls and to allow withdrawal of said closure member through said passage only upon application of a strong force, the annulus being disposed in a plane spaced axially from the annular seat to localize the distention restraint in a zone spaced axially from the annular seat, a plug receivable in the other end passage portion, said plug having a relatively large sectioned part disposed within said other end passage portion and a relatively small sectioned part disposed within the central passage portion, the central passage walls being distended by the small part of the plug and resiliently embracing the latter and a stem on the closure member extending axially through the central and other passage portions, the plug being formed with an axial recess to receive the stem.

References Cited in the file of this patent

UNITED STATES PATENTS

| Number | Name | Date |
|---|---|---|
| 1,590,173 | Anglade | June 22, 1926 |
| 1,905,361 | Bacon | Apr. 25, 1933 |
| 2,057,195 | Keefe | Oct. 13, 1936 |
| 2,088,656 | Lamb | Aug. 3, 1937 |
| 2,094,264 | Crowley | Sept. 28, 1937 |
| 2,219,190 | McCoy | Oct. 22, 1940 |

FOREIGN PATENTS

| Number | Country | Date |
|---|---|---|
| 544,261 | Great Britain | Apr. 3, 1942 |